Feb. 1, 1927.
F. H. McBRIDE
SKID CHAIN FASTENER
Filed May 13, 1925
1,615,845
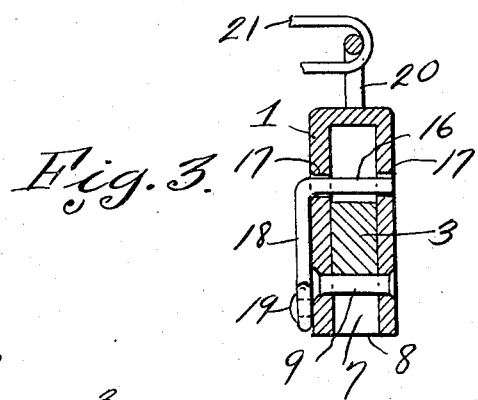
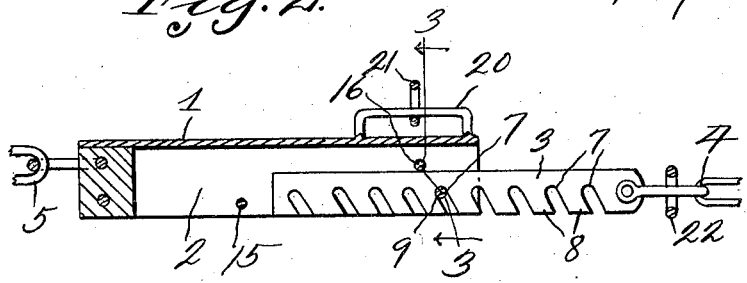
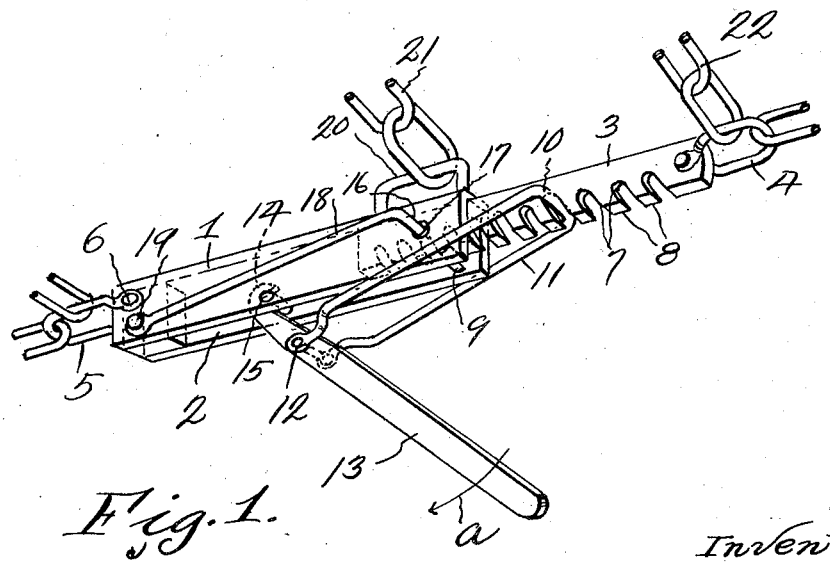
Inventor
F. H. McBride
by Philip A. B. Ferrell
Atty.

Patented Feb. 1, 1927.

1,615,845

UNITED STATES PATENT OFFICE.

FRANK H. McBRIDE, OF BLAIR, NEBRASKA.

SKID-CHAIN FASTENER.

Application filed May 13, 1925. Serial No. 29,987.

The invention relates to skid chain fasteners and tighteners, and has for its object to provide a device of this character comprising an elongated body member U-shaped in transverse cross section, and in which body member is slidably mounted a rack bar having a plurality of teeth, which teeth form recesses, which when the rack bar is forced into the body member receives a pin for holding the rack bar in adjusted position. The rack bar is connected to one end of a skid chain and the body member to the other end of the skid chain.

A further object is to provide the side of the body member with a spring arm terminating in a right angularly disposed portion, which is received in registering apertures of the body member beneath the rack bar when the rack bar is in raised position for holding the rack bar against downward movement and in cooperative engagement with the transversely disposed pin of the body member.

A further object is to provide the body member with a transversely disposed pin for the reception of a hook carried by a lever, which lever is provided with a bail which cooperates with the teeth of the rack bar for forcing the rack bar into the body member and tightening the chain.

A further object is to provide the underside of the body member with an elongated U-shaped member, to which one end of a transverse portion of a tire chain may be connected, thereby allowing the cross chain to assume its natural transverse position in relation to adjacent transverse portions of the tire chain.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the chain fastener and tightener.

Figure 2 is a vertical longitudinal sectional view through the chain fastener and tightener.

Figure 3 is a vertical transverse sectional view taken on line 3—3 of Figure 2.

Referring to the drawing, the numeral 1 designates the body of the device, which body is elongated and is provided with a longitudinally disposed channel 2, in which is slidably mounted a rack bar 3. Rack bar 3 has connected to one end thereof the end 4 of a skid chain side chain, and the other end 5 of which side chain is connected at 6 to the body member 1. When the tire chain is placed on the tire the ends 4 and 5 are drawn together for tightening the tire chain on the tire, and preventing objectionable noise and damage incident to loose tire chains. Rack bar 3 is provided with a plurality of outwardly and rearwardly inclined recesses 7, which recesses form spaced teeth 8. The recesses 7 and teeth 8 have a double function. When the bar 3 is forced inwardly, said bar is held against retrograde movement by a transversely disposed pin 9, which is received in the recesses according to the adjustment of the device. However during the tightening of the device, the recesses 7 receive the transversely disposed portion 10 of the bail 11, which is pivotally connected at 12 to the lever 13, which lever and bail form a tightening tool. Lever 13 is provided with a hook 14 which is hooked over a transversely disposed pin 15 as clearly shown in Figure 1, and which pin forms a fulcrum point for the lever during the tightening operation, and when it is moved in the direction of the arrow $a$. In operation the operator grasps the lever 13, moves the same in the direction of the arrow $a$, which action will impart a pull on the rack bar 3 through the medium of the bail 11, and when the bar 3 is moved a sufficient distance into the body member 1 for tightening the tire chain, the bar is moved upwardly for receiving the pin 9 in one of the recesses 7 thereof, which will hold the bar against outward movement. After the bar is positioned as above set forth, the transversely disposed arm 16, which extends through the registering apertures 17 in the body member 1, will be forced to a position below the bar 3 by means of a spring arm 18, which extends longitudinally at the outer side of the body member 1, and is anchored to one end thereof as at 19, therefore it will be seen that the arm 16 will positively hold the bar 3 against downward movement in the body member and will be positively held in adjusted position by means of the transversely disposed pin 9. During the tightening of the bar 3 the end of the arm 16 slidably engages the side of the bar 3, therefore it will be seen that when the bar 3 is forced upwardly the spring arm 18 will immediately force the arm 16 into position as shown in Figure 3. Extending upwardly from the body member 1 is an elongated U-shaped member 20, to which one end of the cross chain 21 of the tire chain is connected, and which elongated U-shaped member allows the cross chain 21 to assume its proper relation to adjacent cross chains 22 according to the adjustment of the rack bar 3.

From the above it will be seen that a tire chain tightener and fastener is provided which is simple in construction, the parts reduced to a minimum, and one which is positive in its operation, and which may be easily tightened or released, thereby allowing a tire chain to be quickly placed on an automobile tire or removed.

The invention having been set forth what is claimed as new and useful is:—

1. A tire chain tightener comprising a body member having a channel therein, a toothed bar slidably mounted in said channel in spaced relation to the bottom of the channel, a pin extending transversely through the body member and channel above the teeth of the bar, a spring arm secured to one side of the body member, an angularly disposed arm carried by the spring arm and adapted to be received in the body member below the toothed bar between the bar and the bottom of the channel when the pin is disposed in any of the recesses formed by the teeth of the toothed bar.

2. The combination with a tire chain tightener comprising a body member having a channel therein, a toothed bar slidably mounted in the body member, in spaced relation to the bottom of the channel, a transversely disposed pin carried by the body member adjacent the outer side of the channel and cooperating with the teeth of the toothed bar, of a second transversely disposed pin carried by the body member and forming a fulcruming point for a tightening tool and after to be received between the teeth of the bar and a removable member extending transversely through the body member between the toothed bar and the bottom of the body member.

In testimony whereof I hereunto affix my signature.

FRANK H. McBRIDE.